United States Patent
Tsunetomo

(10) Patent No.: US 6,903,877 B2
(45) Date of Patent: Jun. 7, 2005

(54) GRADIENT-INDEX LENS, AND METHOD FOR PRODUCING THE SAME

(75) Inventor: Keiji Tsunetomo, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/446,799

(22) Filed: May 29, 2003

(65) Prior Publication Data

US 2004/0027682 A1 Feb. 12, 2004

(30) Foreign Application Priority Data

May 29, 2002 (JP) ..................................... P2002-154904

(51) Int. Cl.$^7$ ................................................ G02B 3/00
(52) U.S. Cl. ........................ 359/654; 359/652; 359/653
(58) Field of Search ................................. 359/652–654, 359/796; 349/200

(56) References Cited

U.S. PATENT DOCUMENTS 4,601,545 A * 7/1986 Kern ........................... 349/200
4,810,070 A * 3/1989 Suda et al. .................. 359/653

FOREIGN PATENT DOCUMENTS

JP 2000-258607 9/2000

* cited by examiner

Primary Examiner—Georgia Epps
Assistant Examiner—Jack Dinh
(74) Attorney, Agent, or Firm—Whitham, Curtis & Christofferson, PC

(57) ABSTRACT

A micro prismatic structure is formed inside the light transmission face of a gradient-index lens, in which the projections have a height of at least 0.25 $\lambda$ and the distance between the neighboring projections is at most $\lambda$, based on the applied wavelength $\lambda$. Preferably, the micro prismatic structure has conical projection units that are aligned in the light transmission face of the lens in a mode of hexagonal, tetragonal or orthorhombic arrangement. The conical projections may be in any form of circular cones, polygonal cones, flat-headed circular cones (circular cones of which the apex has been cut horizontally) or flat-headed polygonal cones.

9 Claims, 12 Drawing Sheets

PRIOR ART  FIG. 13B     FIG. 13C

PRIOR ART

GRADIENT-INDEX LENS, AND METHOD FOR PRODUCING THE SAME

The present application is based on Japanese Patent Application No. 2002-154904, the entire contents of which are incorporated herein by reference.

BACKGROUND OF THE INVENTION

1. Field of the Invention

The present invention relates to a gradient-index lens which is used in optical communication, display devices, image-reading devices such as scanners, information-storage devices such as optical discs, etc.

2. Related Art

Lenses are utilized in various optical fields of optical communication, display devices, etc. Of those, gradient-index lenses are differentiated from other ordinary homogeneous lenses in that their characteristics are defined only by the external shapes of the lenses.

Gradient-index lenses include, for example, those having a concentric circular refractive index profile 16 that runs from the center axis 70 of a cylindrical substrate 11 toward the outer periphery thereof, as in FIG. 13A; those having a semispherical refractive index profile 26 that runs from the surface of a planar substrate 21 toward the inside thereof, as in FIG. 13B; and those of a spherical or non-spherical lens 32 with a refractive index profile 36 introduced in the direction of the optical axis thereof, as in FIG. 13C.

In the following description, the lenses as in FIG. 13A are referred to as rod lenses; those as in FIG. 13B are as planar lenses; and those as in FIG. 13C are as axial gradient-index lenses. These will be all referred to as a generic term of gradient-index lenses. The rod lenses are cylindrical and their lens faces may be flattened, and therefore, their maintenance and positioning are easy. In addition, since their shape is well compatible with the shape of optical fibers, the rod lenses are widely used especially in the field of optical communication. The planar lenses are suitable to fabrication of microlens arrays with many microlenses aligned, and they are suitable to optical systems for processing light in parallel.

These lenses are all required to have a reduced-refractive index on their lens races. There are two purposes of reducing the refractive index on the lens faces, which are mentioned below.

One is to reduce as much as possible the loss to be caused by the lens insertion (insertion loss); and another is to reduce as much as possible the negative influence of the light reflected on the lens face to return to the light-emitting side (referred to as "reflected return light"), and this is especially important in the field of optical communication.

For reducing the surface reflection of gradient-index lenses, generally employed is a method or coating the lens face with a single-layered or multi-layered, thin dielectric film. This is referred to as an antireflection (AR) film, and is used not only in gradient-index lenses but also in any ordinary homogeneous curved lenses and other various parts and articles.

According to the method, the insertion loss is reduced and the reflected return light is also reduced. However, when the reflected return light must be reduced more, often employed is a method of polishing the lens face 17 of a gradient-index lens 13 in the direction oblique to the optical axis 72 to thereby make the reflected light 76 from the lens face 17 shifted from the running direction of the incident light 14, as in FIG. 14.

The method may be combined with the AR film 19, as in FIG. 14. In a planar lens 23 as in FIG. 16, not the lens face but the back of the substrate 27 is polished in the oblique direction, whereby the lens face is inclined relative to the optical axis and the reflected return light can be thereby reduced.

The above-mentioned methods have been already applied to commercial products, and gradient-index lenses having an extremely reduced reflectance on the lens faces are widely used.

However, the above-mentioned methods have some problems mentioned below.

AR films shall have a different reflectance, depending on the refractive index of the material to be coated with them. Literally, the gradient-index lenses of FIGS. 13A, 13B and 13C all have a different refractive index in the center and the periphery of the lenses. Accordingly, for making the entire lens face have good antireflection capability, the AR film to be formed on the lenses must be so designed that its antireflection capability may vary in accordance with the refractive index profile of the lenses varying from the center to the periphery of the lenses.

Such a high-performance AR film generally has an increased number of constitutive layers, and will take a long time for forming the layers, and, as a result, the cost of the lenses inevitably increases. When an inexpensive AR film having a small number of layers is used, it still undergoes surface reflection in some degree, owing to the refractive index profile of the lens substrate as so mentioned hereinabove, and it does not satisfy the recent high-level requirement for antireflection.

In addition, the AR film still has other problems mentioned below.

Another embodiment of gradient-index lenses is known as in FIG. 15, in which two lenses 13a and 13b are made to face each other via an optical functional part 42 such as an optical filter sandwiched between them, and the light running from the optical fiber 43a is, after having received the action of optical functional part 42 that acts thereon, led into the other optical fiber 43b. For the structure of this embodiment, the optical fibers 43a, 43b, the lenses 13a, 13b, and the optical functional part 42 must be bonded to each other via an adhesive 30 to assemble them into the lens structure.

The capability of the AR film 19 varies depending on the refractive index of the substrate, as so mentioned hereinabove. In a case where the outer face of the AR film 19 is kept in contact with anything other than air (in this embodiment, this is kept in contact with the adhesive 30), as in FIG. 15, the property of the AR film s further varied depending on the refractive index of the medium to which the film is contacted. For example, the refractive indices of lens substrates and adhesives individually vary in a different manner depending on the ambient temperature around them, and, as a result, the antireflection capability of the AR films adjacent to them shall vary in accordance with their variation. Further, if their refractive indices have varied owing to the deterioration of the lens substrates and the adhesives, then the antireflection capability of the AR films adjacent to them will also vary. The antireflection capability change in the AR films is also a serious problem in view of the recent high-level requirement for antireflection of lenses.

In the related art technology, a method of polishing the lens face of a gradient-index lens in an oblique direction is employed, as so mentioned hereinabove, but the oblique polishing in the method has the following problem.

Polishing micro parts in an oblique direction requires a complicated operation. In addition, since the lens face is polished obliquely, the mechanical center axis of the lens will be inevitably shifted from the optical center axis thereof for attaining good light concentration through the lens. Therefore, when the thus-processed microlens is built in an optical module, its constitution shall be complicated.

The constitutive parts may be aligned almost linearly, as in FIG. 15. Also in this structure, however, the optical axis center and the mechanical center of the lens are shifted from each other in some degree, and therefore, the structure is more readily influenced by the lens aberration. This will result in the increased requirement for higher registration accuracy in parts assembly, and therefore in the increase in the production costs.

SUMMARY OF THE INVENTION

The present invention has been made for solving these problems, and an object thereof is to provide a gradient-index lens which may reduce the insertion loss and the reflected return light through it and of which the property is stable, not depending on the ambient temperature and time.

The gradient-index lens of the invention has solved the above-mentioned problems, and its constitution is described below.

The gradient-index lens of the invention has a micro prismatic structure in its light transmission face. Preferably, the projections to form the micro prismatic structure have a height of not less than 0.25 λ and the distance between the neighboring projections is not more than λ, based on the applied wavelength λ.

Having the micro prismatic structure, the gradient-index lens enjoys antireflection, even though its lens surface is not coated with an AR film or is not worked to have a slanting face. In particular, since the micro prismatic structure is directly formed in the lens face, the structure itself may have the same refractive index profile as that of the lens. Accordingly, one advantage of the gradient-index lens of the invention is that any and every lens fare having any refractive index profile may be processed to have the same antireflection capability only by forming the micro prismatic structure in the lens face.

Regarding the type of the gradient-index lens, the invention may apply to any of the following:

A cylindrical lens having a concentric refractive index profile starting from its center axis toward the radial direction thereof.

A planar lens having a semispherical refractive index profile starting from its surface.

A spherical or non-spherical lens having a refractive index profile running in the optical axis thereof.

Preferably, these gradient-index lenses are formed through ion-exchanging. Also preferably, glass is served as their mother material.

Preferably, the micro prismatic structure has conical projection units that are aligned in the light transmission face of the lens in a mode of hexagonal, tetragonal or orthorhombic arrangement. These arrangements may be mixed and the units may be two-dimensionally aligned.

Preferably, the conical projections are so designed that the cross-sectional area thereof gradually decreases from the bottom toward the apex thereon. Concretely, it is desirable that they are in any form of circular cones, polygonal cones, flat-headed circular cones (circular cones of which the apex has been cut horizontally), flat-headed polygonal cones, etc. Such conical projections may have a curved or stepwise-inclined slope, or may have a curved apex.

Preferably, the process of forming the micro prismatic structure in the gradient-index lens of the invention comprises the following steps:

(1) applying a photoresist to a surface of the substrate;

(2) exposing a two-dimensional periodic pattern on the photoresist;

(3) developing the photoresist to form a photoresist pattern having a two-dimensional periodic structure;

(4) etching the substrate with the photoresist pattern as a mask.

The substrate may be etched via a mask of the photoresist pattern. Attentively, a film constituted by one of a metal film, a resin film or an inorganic dielectric film may be formed on the surface of the substrate in which the micro prismatic structure is to be formed before the step (1) of applying the photoresist thereon. When this one film is formed on the surface, the film is etched with the photoresist pattern as the mask so that the photoresist pattern is transferred to the film, and the substrate is etched with said one film to which the photoresist pattern has been transferred in the step (4) of etching the substrate.

In the step (2) of exposing the photoresist, the exposure amount may be controlled so as to vary the pattern in accordance with the refractive index profile of the substrate. In addition, the two-dimensional periodic pattern may be formed through multiple exposure to be effected by multiple rotations of a periodic light intensity distribution as an interference pattern that is formed through laser ray interference.

The laser ray interference may be effected in any of a method of separating one laser ray followed by again combining it with the others, or a method of using a phase grating.

Preferably, the substrate is dry-etched in the step (4).

DETAILED DESCRIPTION OF THE PREFERRED EMBODIMENTS

Embodiments of the invention are described in detail hereinunder with reference to the drawings attached hereto.

EXAMPLE 1

Figure 1:
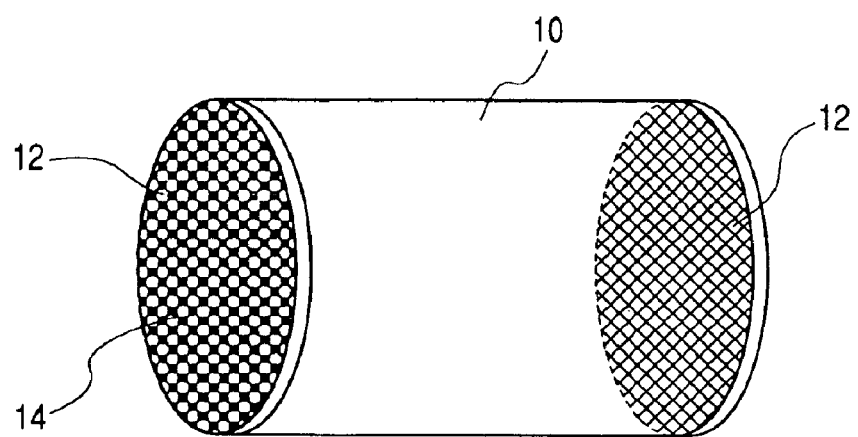
FIG. 1 is a perspective schematic view or a rod lens of the invention that has a micro prismatic structure formed on its end faces.

FIG. 1 shows one embodiment of rod lenses of the invention.

A micro prismatic structure 14, in which the projections having a height of about 1 $\mu$m are aligned at a distance between neighboring projections (pitch) of 1 $\mu$m, is formed in both end faces 12 of a cylindrical, glass rod lens 10 having a diameter of 1 mm and having a refractive index profile that decreases toward the outer periphery thereof.

The rod lens 10 of FIG. 1 is fabricated according to the process mentioned below. The rod lens used herein is prepared according to an ion-exchanging process that comprises dipping a homogeneous cylindrical glass rod in a molten salt to thereby exchange the ions in the glass rod with the ions in the molten salt, and the ion concentration in the resulting rod lens gradually varies from the outer periphery toward the inside thereof to thereby make the rod lens have a refractive index profile.

The rod lens (hereinafter this will be simply referred to as "lens") is cut into a piece having a predetermined length, and the two end faces are optically polished. The lens is ultrasonically washed in an organic solvent to remove the contaminants and the impurities having adhered to the end faces thereof. Next, a photoresist is applied to the lens faces in a mode of spin coating to thereby form a photoresist layer thereon having a thickness of about 1 $\mu$m. The photoresist used is a positive photoresist THMR-iR3650 (by Tokyo Ohka). This is pre-baked in a thermostat, and its photoresist is patterned through interference exposure.

Figure 12:
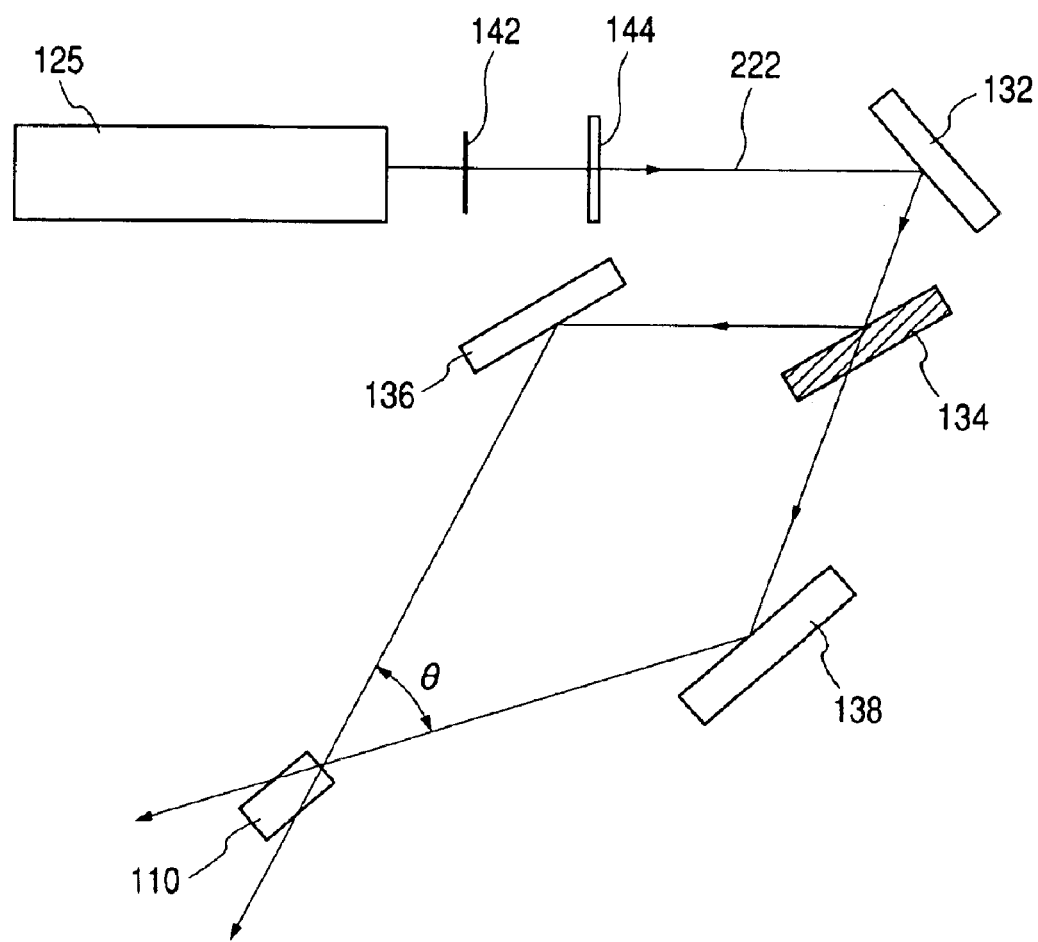
FIG. 12 is a view showing the constitution of an optical system for two-beams interference exposure.
Figure 13A:
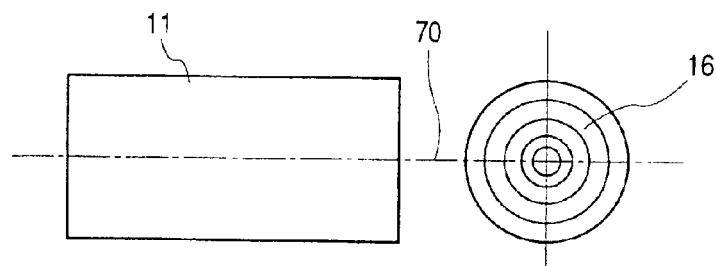
FIGS. 13A though 13C show schematic views of the cross-sectional profiles of conventional gradient-index lenses.
Figure 13A:
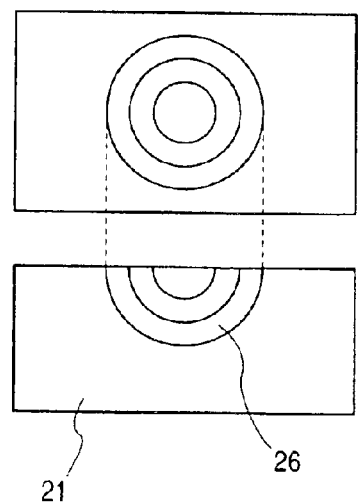
Figure 13A:
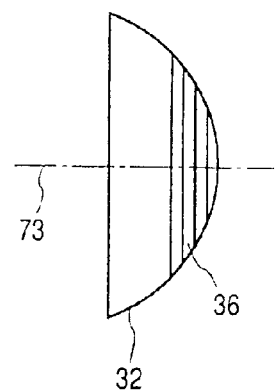
Figure 14:
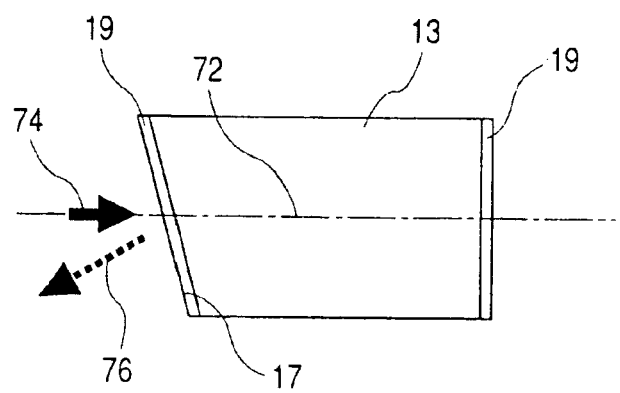
FIG. 14 is a view showing one example for antireflection of a conventional slope-cut rod lens.

For the interference exposure, an interference optical system of FIG. 12 is used. The light source 125 is an He—Cd laser (wavelength: 325 nm, output: about 20 mW), and the optical beam 222 emitted by it is split through the beam splitter into two beams in an output ratio of 1:1. After having passed through different optical paths, the two beams are again combined. In a site in which the optical beams are combined, the resist-coated lens 110 is put, and an interference pattern is formed on its end face. To form the optical paths, mirrors 132, 136 and 138 are used and the direction of each optical beam is varied. To attain a desired exposure degree, a filter 144 is inserted in the optical path before the original beam is split, and the exposure time is controlled by the shutter 142.

As is well known, the interference pattern pitch $\Lambda$ is represented by the following formula in which $\theta$ represent the angle formed by the two beams:

$$\Lambda = \lambda/2 \sin(\theta/2).$$

In this, $\lambda$ vindicates the wavelength of the optical source applied to the lens (in this Example, this is 325 nm). Since the pitch of the projections to be formed is 1 $\mu$m, the angle is defined to be $\theta$=20.4 degrees. Needless-to-say, the interference exposure may be effected at any other different pitch. Any desired pitch that satisfies the above-mentioned relational formula may be defined by controlling the wavelength $\lambda$ of the laser light and the beam angle $\theta$.

For the light source, any laser with output energy capable of sensitizing the photoresist is usable, including, for example, gas lasers such as Ar laser, and solid lasers such as a YAG laser.

In this Example, the photoresist is exposed in the interference optical system in which one laser ray is separated and again combined with the others. Apart from it, the same interference exposure as in this Example may be effected according to a method of using a phase grating. The phase grating is a type of optical transmission diffraction gratings, and it is so designed that its zero-order diffracted light may be extremely small relative to a specific wavelength. Through its ± first-order interference, the phase grating forms an interference pattern just below it.

Interference exposure is employed herein. This is because its constitution is simple and it is favorable for short-pitch exposure. Apart from it, reduction projection aligners and the like are also usable for this purpose. In addition, electron imaging devices may also be used for exposure for this purpose, though they may take a long time for image formation. Needless-to-say, the type of the photoresist to be used should be changed in accordance with the type of the exposure devices to be used for it.

In the above-mentioned interference exposure system, the photoresist is exposed to have a stripe-like (one-dimensional) periodic pattern only. Therefore, for two-dimensional exposure, that one-dimensional exposure must be repeated multiple times to attain multiple exposure. In this Example, the lens is rotated by 90 degrees after the first exposure, and the second exposure is effected in that condition to obtain a tetragonal lattice pattern. Needless-to-say, three times or more multiple exposure may also be possible. For example, for three-times exposure, the substrate is rotated by 60 degrees in every exposure, and this may have a hexagonal close-packed structure pattern.

Figure 2:
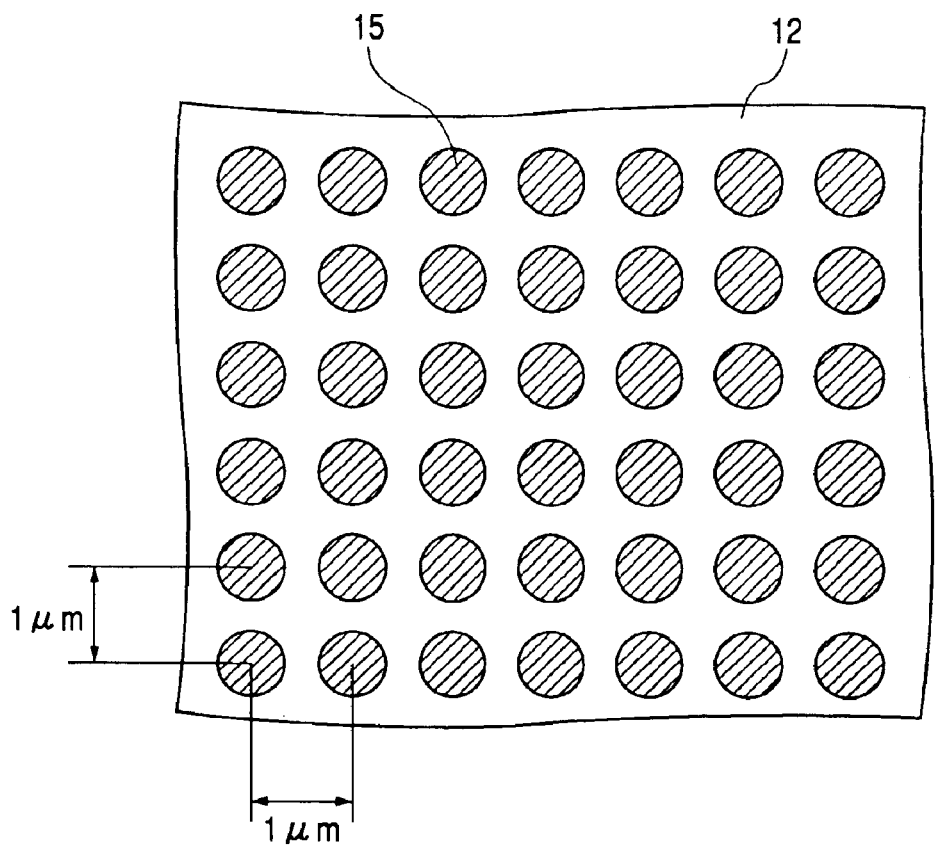
FIG. 2 shows one example of a photoresist pattern to be used in forming the micro prismatic structure in the invention.

After the exposure in the manner as above, the substrate is post-baked, and then developed with an HMD-3 developer (by Tokyo Ohka) to remove the resist from the exposed area. As a result, a photoresist pattern 15 having a two-dimensional periodic structure as in FIG. 2 is obtained.

Figure 3:
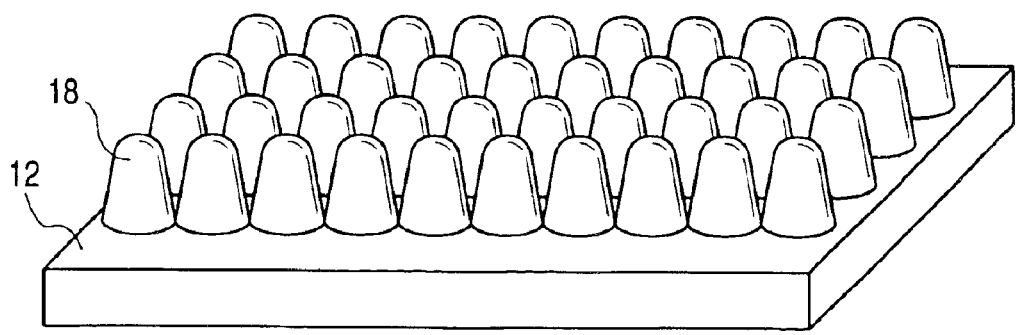
FIG. 3 is a schematic View showing the micro prismatic structure formed on a lens end face in the invention.

Next, via a mask of the photoresist pattern 15, the substrate is dry-etched with ICP (inductively-coupled plasma) whereby the photoresist pattern is transferred onto the surface 12 of the lens substrate. The power, gas, pressure and other working conditions to be applied to the ICP device may be controlled in this step, and various micro prismatic structures are thereby formed. FIG. 3 is a schematic view showing an electromicroscopic observation of the projections of the micro prismatic structure formed herein. By controlling the process condition in forming the structure, the vertical etching rate and the horizontal etching rate relative to the lens face are suitably controlled, and conical projections 18 each having a rounded apex are thus formed herein.

Using any other process condition, cylindrical projections or sharper conical projections may be formed. For the object of the invention that is to reduce the reflection on the lens end face to thereby reduce the insertion loss through the lens, the projections of the micro prismatic structure must be so designed that the cross section thereof simply decreases from the bottom to the top thereof. One preferred embodiment for them is a conical projection, which may include circular cones, polygonal cones, flat-headed circular cones (circular cones of which the apex has been cut horizontally) flat-headed polygonal cones, etc. Such conical projections may have a curved or stepwise-inclined slope, or may have a rounded apex as in FIG. 3.

In this Example, ICP dry etching is used. Apart from it, also usable herein are any other various etching modes to be effected via a photoresist pattern mask. For example, a different dry-etching process with ECR plasma may be employed, and, for some types of lens substrates, a wet-etching process may be employed.

In this Example, the lens substrate is etched via the photoresist mask formed on the lens end faces. Apart from it, a different method may also he employed herein, which comprises forming a metal film such as Cr, or a resin film, or an inorganic dielectric film on the lens end faces, applying a photoresist thereonto, patterning it through interference exposure, etching the film to thereby transfer the pattern to the film, and further etching the substrate via a mask of the thus-patterned film. In particular, when a glass substrate is patterned in a mode of wet etching with acid, it is generally processed via a mask of a thin film of Cr or a Cr compound. This method may apply to the invention of fabricating gradient-index lenses of glass.

Depending on the etching process and the process condition employed, the constitution of the micro prismatic structure to be formed naturally varies. Therefore, the process and its condition should be investigated and determined so that the intended micro prismatic structure can be formed through the process.

Figure 4:
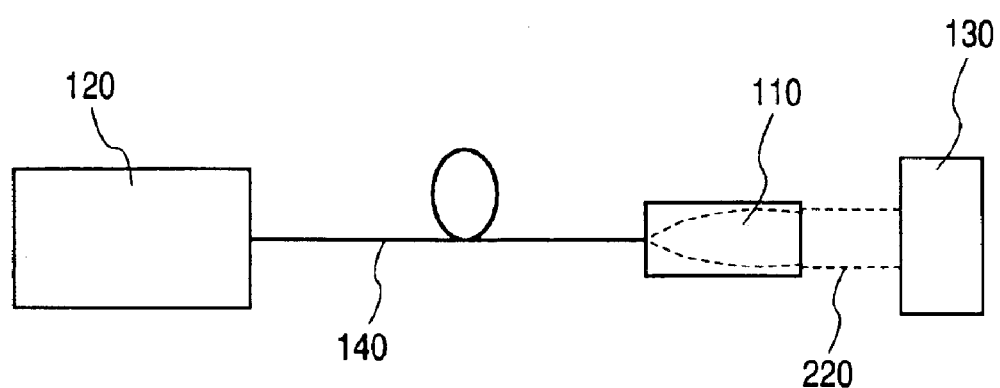
FIG. 4 is a view showing the constitution of an optical system for measuring the reflectance on a lens end face.

In this Example, the resist formed on the rod surface is also etched away in the ICP etching step. In this, therefore, the resist removal is not effected after the process to obtain the intended lens. However, if some resist has remained on the lens formed the resist residue may be removed by washing with an organic solvent or by ashing with oxygen plasma. In case where the etching is effected via a metal film or the like that serves as a mask, the mask residue shall be removed with an etching or the like after the etching treatment FIG. 4 shows a schematic view of a reflection loss measuring device for the gradient-index lens fabricated according to the method of this Example. The light source 120 is a laser diode having an emitting wavelength of 1550 nm. As illustrated, the length of the rod lens 110 is so controlled that it may pass the light from the single-mode optical fiber 140 to give nearly parallel rays 220. Before the lens is fitted to the device, the light intensity at the outlet of the optical fiber is measured with a power meter 130 (this is represented by Iin). Next, the lens 110 is fitted to the device, and then the quality of light (Iout) that has passed through the lens is measured.

The lens transmittance T is represented as follows:

$T = Iout/Iin.$

Therefore, when the absorption loss and the scattering loss inside the lens are both small, the reflectance R on the lens end faces, or that is, the total on the light-receiving face and the light-emitting face is obtained as follows:

$R = 1 - T.$

In this device, the reflectance on the end faces of the gradient-index profile rod lens, before processed to have a micro prismatic structure in the end faces thereof, is measured, and it is about 7%. The gradient-index lens used herein does not have an AR film of an ordinary thin dielectric film.

Next, the gradient-index profile rod lens of the invention, which has the micro prismatic structure described in this Example on both lens faces (shown in FIG. 1), is fitted to the device, and the reflectance is measured. It is not larger than 1%. This obviously confirms the reflectance reduction on the lens end faces. The numeral value varies depending on the shape of the micro prismatic structure formed in the lens face. By varying the process condition and by optimizing the micro prismatic structure, the reflectance may be further reduced.

EXAMPLE 2

This Example is to demonstrate the applicability of the invention to a gradient-index lens formed in a planar substrate, or that is, to a planar gradient-index lens.

Figure 5:
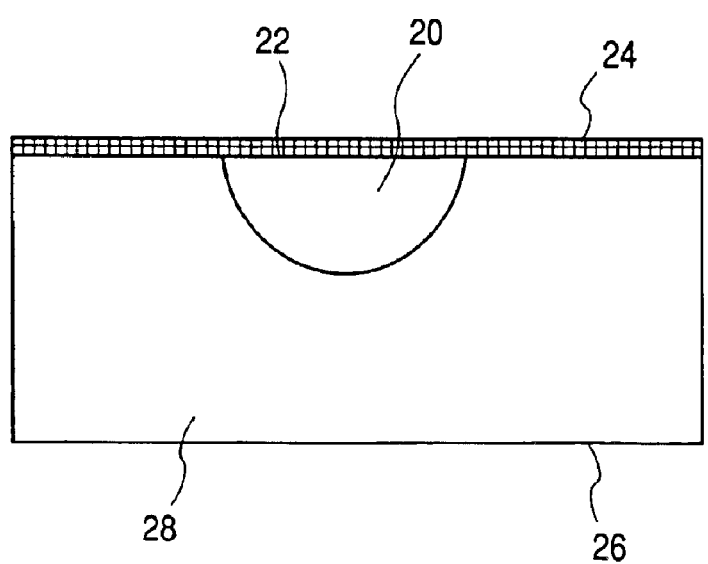
FIG. 5 is a schematic cross-sectional view of a planar lens of the invention which has a micro prismatic structure on its light transmission face.

FIG. 5 shows a planar lens 20 of the invention. Like in Example 1, the lens face 22, or that is, the surface of the substrate 28 is processed to have a micro prismatic structure 24 with projections having a height of about 1 $\mu$m and aligned at a pitch of 1 $\mu$m.

In case where a glass substrate is used, the planar lens 20 is fabricated as follows: A metal task having micropores is formed on the substrate, and ions of a salt are diffused into the substrate through the micropores for ion-exchanging. As compared with the lens in Example 1, the refractive index profile in the surface of the lens thus fabricated herein is low. However, since the lens is fabricated according to the ion-exchanging method as above, the lens face surely has a refractive index profile.

In the same manner as in Example 1, a micro prismatic structure with projections having a height of about 1 $\mu$m and aligned two-dimensionally and periodically at a distance between neighboring projections (pitch) of 1 $\mu$m is formed on the surface of the planar lens, and the reflectance of the lens is measured by the use of the device of FIG. 4. It is about 3.5%. In this Example, the back face 26 opposite to the lens face of the planar lens is not processed for antireflection. Therefore, the back face produces reflection loss. Naturally, the back face may be processed for antireflection by forming an ordinary multi-layered dielectric film thereon; or, as the case may be, the same micro prismatic structure as in the lens face as above may be formed also in the back face for its antireflection. In that case, the thus-processed back face produces little reflection thereon, and it is easy to realize the reflectance of the same level as in Example 1, or that is, a reflectance not higher than 1%.

In Embodiments 1 and 2, it has been revealed that an excellent antireflective performance can be obtained by providing a micro prismatic structure in which the projections having a height of about 1 $\mu$m are aligned at a distance between neighboring projections (pitch) of 1 $\mu$m, with respect to the applied wavelength $\lambda$ of 1550 nm.

Reflective properties are varied in accordance with the pitch and the height of the projections in the micro prismatic structure. Sufficient antireflective performance cannot be obtained when the pitch, namely the distance between the neighboring projections is more than $\lambda$, or the height of the projections is less than $\lambda/4$ (0.25 $\lambda$) since the interaction between the input light and the micro prismatic structure becomes small.

The pitch and height of the micro prismatic structure in both embodiments was selected to be about 0.64$\lambda$, however, it is desirable that the pitch, namely the distance between the neighboring projections is not more than λ, and the height of the projections is not less than 0.25 λ.

In Example 1, the antireflection capacity that varies depending on the shape of the projections formed on the lens face is described in some degree. Some other examples of the micro prismatic structures having different shapes formed by the present inventors will be described herein.

FIGS. 6A through 6D show schematic views of cross sections of various micro prismatic structures formed by varying the dry-etching conditions herein.

By controlling the vertical etching rate and the horizontal etching rate, various micro prismatic structures having different cross sections (FIGS. 6A to 6D) are formed.

Figure 7:
FIG. 7 shows a schematic cross-sectional view of another micro prismatic structure.

FIG. 7 shows an example of forming a micro prismatic structure on an end face of a gradient-index lens of glass in a mode of wet etching. In this case, the glass substrate is etched almost isotropically, and therefore it is impossible to reduce the pitch of the two-dimensional structure and to increase the height of the projections. Accordingly, it will be difficult to obtain a satisfactory antireflection capability in this case, but the advantage of this embodiment is that the production costs are low. Therefore, this embodiment is applicable to the use not requiring high-level antireflection.

The condition of the shape for attaining antireflection is described in, for example, JP-A2000-258607 and the references cited therein. It is desirable that the micro prismatic structure formed on the end face of the gradient-index lens or the invention may also have any of the shapes described in them.

In particular, it is more desirable that the micro prismatic structure has an almost close-packed structure near the substrate (that is, when the micro prismatic structure is seen from its upside, toward its top face, its recesses do not have a flat part).

Figure 8A:
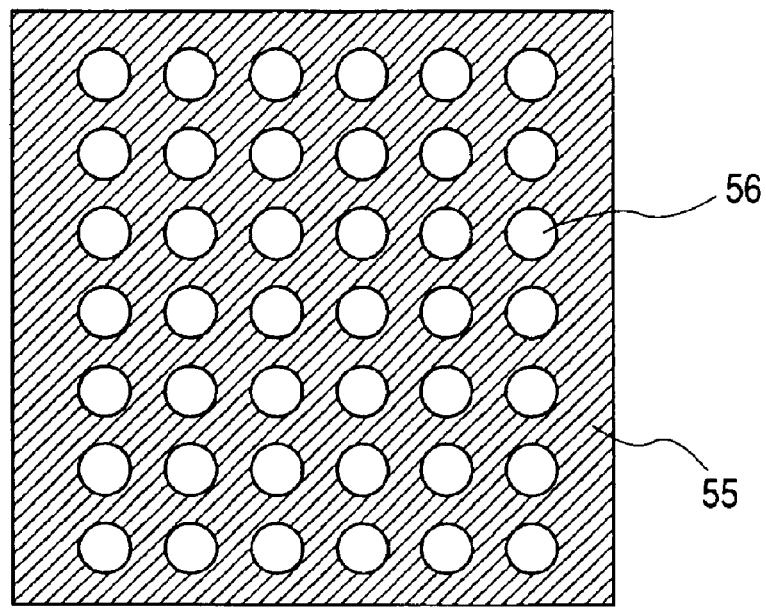
FIGS. 8A and 8B show schematic views of a photoresist pattern and a micro prismatic structure of a processed lens surface.
Figure 8B:
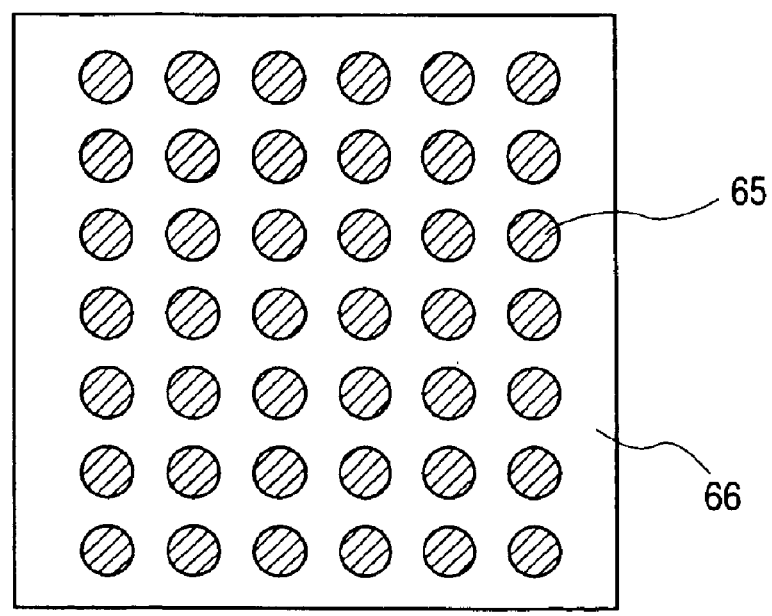

The shape or the micro prismatic structure formed may vary, not only depending on the etching condition as mentioned above but also depending on the photoresist pattern before etched FIGS. 8A and 8B show schematic views of a photoresist pattern that is obtained by varying the light intensity or the exposure time, namely by varying the exposure amount in interference exposure, and a micro prismatic structure of the lens surface after etched under the same condition.

Figure 6A:
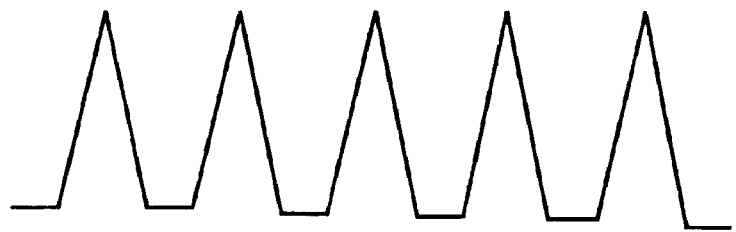
FIGS. 6A through 6D show schematic cross-sectional views of various micro prismatic structures.
Figure 6B:
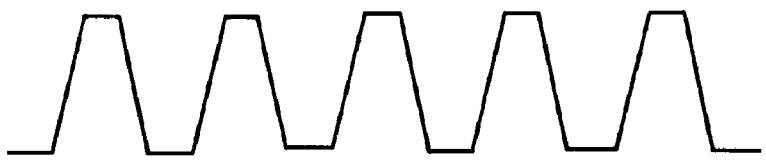
Figure 6C:
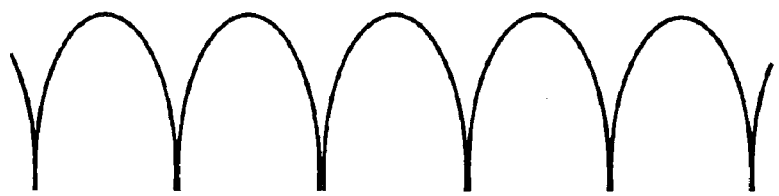
Figure 6D:
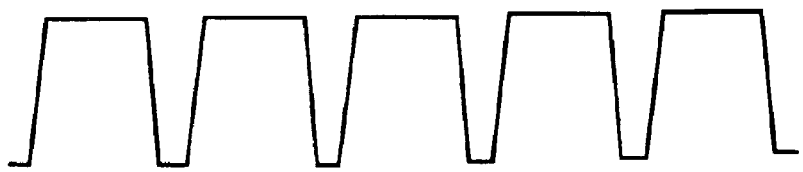

In case of positive photoresists, when the exposure amount is small, it gives a pattern of FIG. 6A where the photoresist film 55 has circular holes 56 formed therein. On the other hand, when the exposure amount increases, it gives a pattern of FIG. 8B where the unexposed photoresist film 65 remains like circular spots and the other area 66 does not have a photoresist film. When the two are individually etched, FIG. 8A gives a lattice-like micro prismatic structure, and FIG. 8B gives a micro prismatic structures with nearly conical or flat-headed conical projections.

Figure 9:
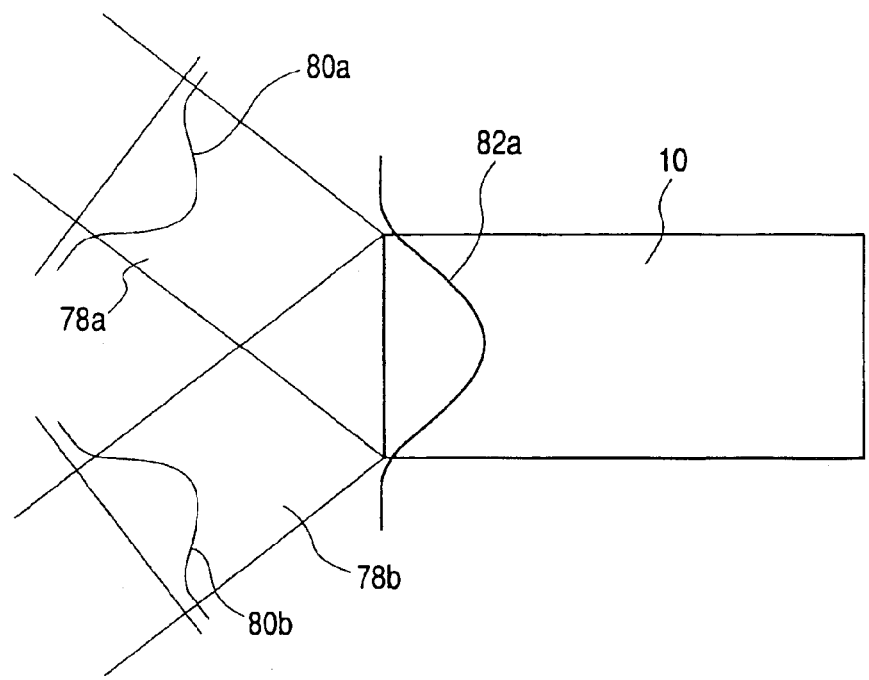
FIG. 9 is a view showing one example of interference exposure applicable to the invention.

When the above-mentioned effect is utilized in interference exposure, for example, a rod lens 10 may be processed to have a pattern of which the shape varies from the lens face toward the outer periphery thereof. FIG. 9 shows an optical exposure system to he used for it.

As illustrated, the lens is so controlled that the light beams 78a and 78b from an interference optical system may have a light intensity distribution 80a and 80b, respectively, in their cross section. The interference of the two beams gives the same light intensity distribution 82. In the area where the light beams have overlapped with each other, they have an oval cross section, but give a pattern of which the profile varies almost isotropically from the center toward the outer periphery of the lens 10.

Figure 10:
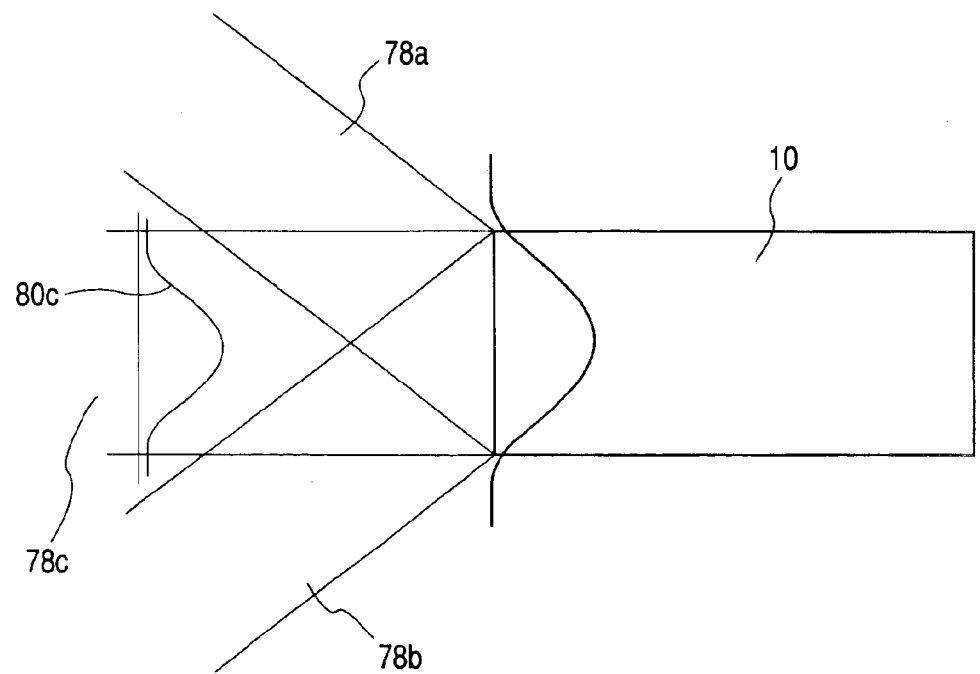
FIG. 10 is a view showing another example of interference exposure applicable to the invention.

FIG. 10 shows another embodiment of forming the pattern. In this embodiment, the interference exposure is effected in the same manner as in Example 1, and then a third light beam 78c is applied nearly to the front of the exposed face of the lens 10 to thereby make the lens 10 have a light intensity distribution 80c within the range of the beam. To that effect, the intensity of light to which the lens 10 is exposed is controlled.

The above-mentioned method may be effectively utilized when the etching rate of the gradient-index lens shall vary depending on the refractive index (or the ion concentration). In dry etching, it is generally known that the etching rate varies depending on the size of the aperture of the mask used. In the above-mentioned method, when a pattern having a different aperture size is formed on the end face of a lens and then the lens is etched, then the thus-etched lens face may have a micro prismatic structure of which the profile corresponds to the refractive index difference (that is, the etching rate difference). If desired, the projections of the micro prismatic structure in the center part of the lens face of a rod lens may be high and those in the peripheral part thereof may be low.

In the applications in which the wave face of the light having passed through a lens should not be disordered, the above-mentioned profile control is especially important. The above-mentioned profile control method is therefore effective for the applications.

In the embodiments described hereinabove, specifically referred to is the antireflection capability of gradient-index lenses of which the lens face is kept in contact with air. Not limited to these, the lenses of the invention also exhibit the same effect even when their faces are in contact with any other media than air.

Figure 15:
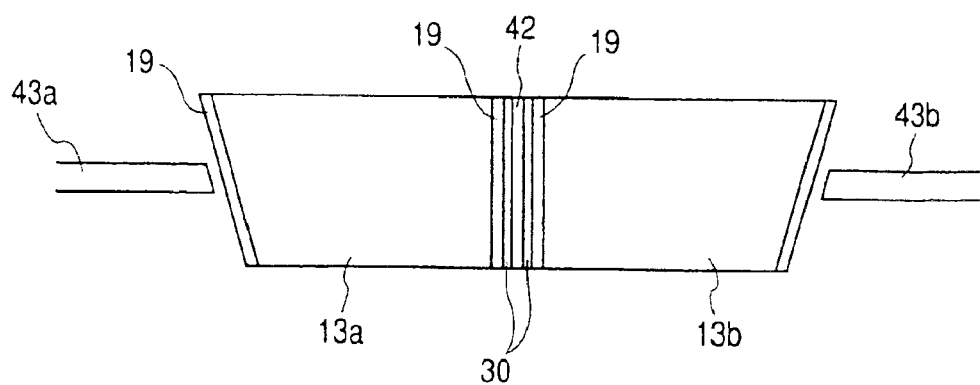
FIG. 15 is a schematic view that shows one example of a conventional optical module with facing rod lenses.
Figure 16:
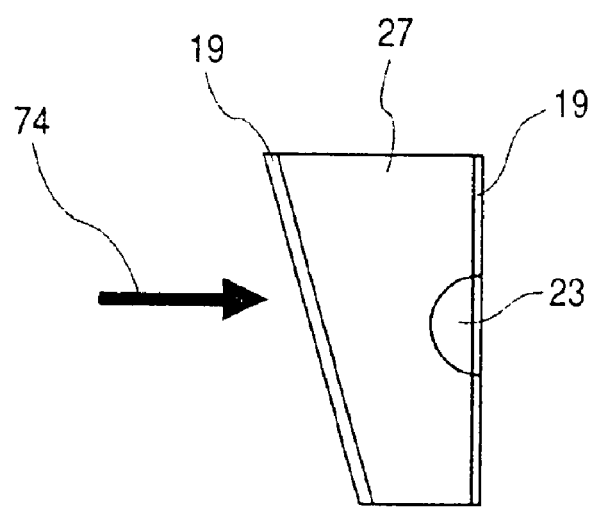
FIG. 16 is a view showing one example for antireflection of a conventional slope-cut planar lens.

As in FIG. 15, two lenses 13a and 13b may be combined along with an optical functional part 42 such as a filter put therebetween to give a rod lens. For reducing the reflection loss in the conventional rod lens of the type, an AR film of a multi-layered dielectric film is attached to each lens face, as in FIG. 15, and, in addition, the adhesive 30 used for bonding the two parts is specifically so controlled that its refractive index may he the same as that of the lens material. The problem with the combined lens structure includes the temperature profile and the time-dependently varying refractive index profile thereof.

Figure 17:
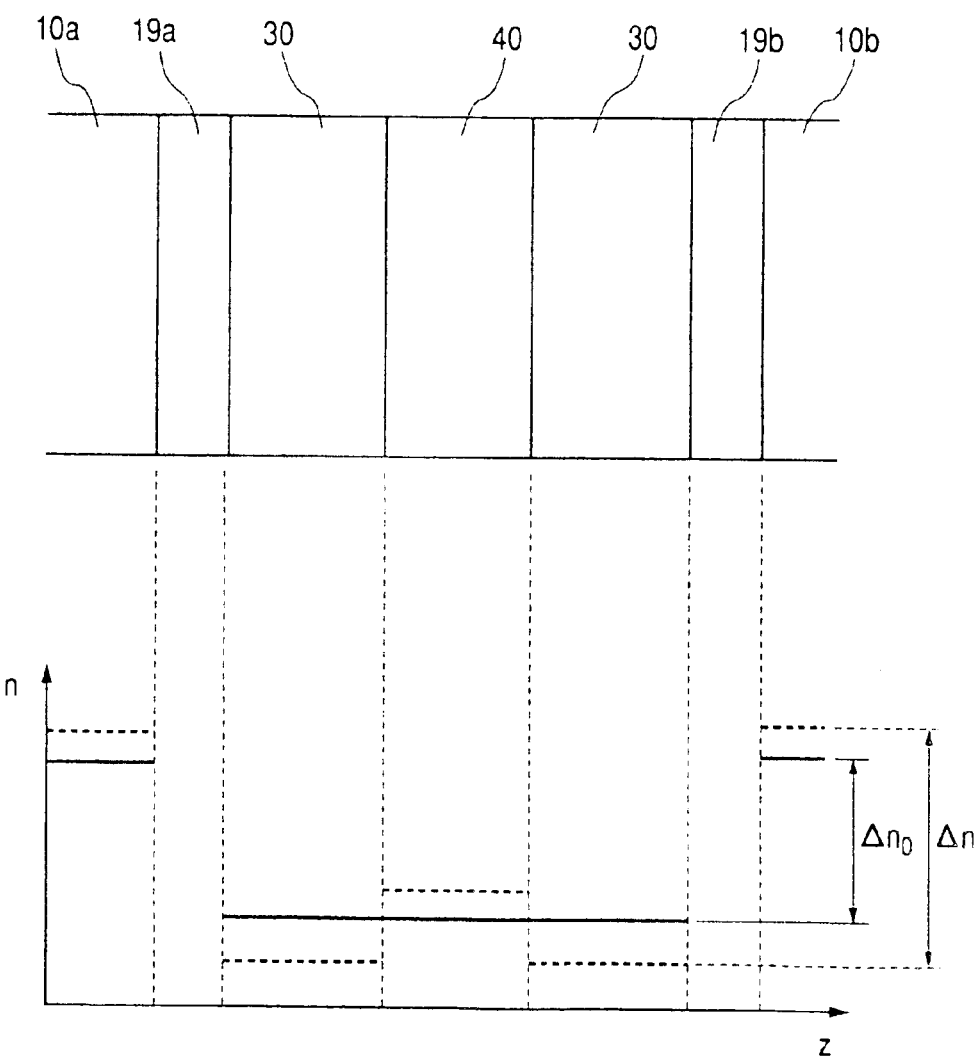
FIG. 17 is a schematic view showing the constitution of a conventional optical module with facing rod lenses, and its refractive index profile in the direction of the optical axis of the lens.

FIG. 17 is referred to, which shows a profile of refractive index n in the direction of the optical axis (Z-axis) of a combined lens structure. In this, AR films 19a and 19b are formed on the surfaces of two lenses 10a and 10b, respectively, and the two lenses are bonded with an adhesive 30 via a part 40 put between them. Immediately after assembled, since the refractive index of the lenses 10a and 10b could be strictly the same as that of the adhesive as indicated by the full line in FIG. 17, the reflection loss through the lens could be reduced to a considerable extent by providing the AR films 19a and 19b between the adhesives 30 and the lenses 10a and 10b respectively where a index difference $\Delta n_0$ is present. However, when the refractive index of the adhesives or that of the lens have varied due to the ambient temperature change or with the lapse of time, as indicated by the dotted line, reflection loss may occur in the interfaces of the lenses and adhesives. Moreover, the index difference Δn between the adhesives 30 and the two lenses 10a and 10b may be shifted from the initial index difference $\Delta n_0$, so that the antireflective function of the AR films 19a and 19b that is designed according to the initial index difference $\Delta n_0$ is deteriorated. Accordingly, there is a fear that the reflective loss would increase in the devices using such the AR films.

Figure 11:
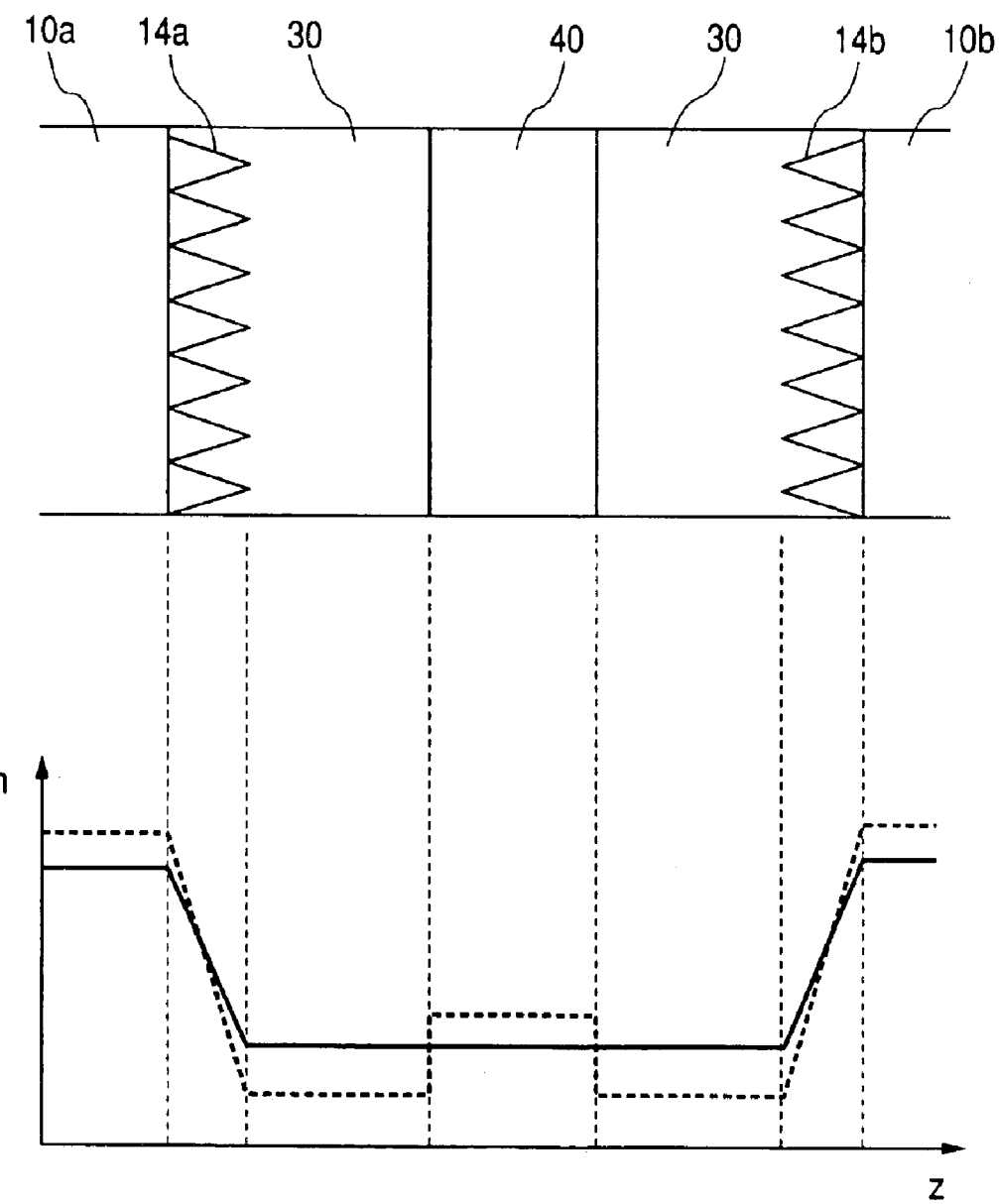
FIG. 11 is a schematic view showing the constitution of a combined, gradient-index lens of the invention, and its refractive index profile in the direction of the optical axis of the lens.

In the gradient-index lens of the invention, the two lenses 10a and 10b have micro prismatic structures 14a and 14b, respectively, formed on their surfaces, as in FIG. 11. A medium outside each lens (an adhesive in this case) enters the gaps of the micro prismatic structure. Macroscopically, therefore, the refractive index profile of the combined structure may all the time continue between the lens and the medium via the micro prismatic structure. In addition, the combined lens structure realizes its antireflection capability owing to the micro prismatic structure that is formed of the same material as the lens material, precisely, formed of a material that is the same as the material or each part of the lens face. Accordingly, even when the refractive index of the adhesive becomes different from that of the lens as in the related art mentioned above, the refractive index profile between the lens and the adhesive in the combined lens structure of the invention may be all the time kept changing continuously, and therefore the performance of the lens structure of the invention does not worsen.

This is a function capable of being realized by the characteristic that the combined lens structure may maintain its antireflection capability not depending on the refractive index of the medium existing between the two lenses combined, and this is one significant characteristic feature of the gradient-index lens or the invention. Because of this characteristic, it may be unnecessary to strictly control the refractive index of the adhesive in accordance with that of the lens in assembling the parts as in FIG. 15, and this produces great industrial advantages in chemical control and energy saving.

The gradient-index lens of the invention realizes its antireflection capability owing to the micro prismatic structure formed on its surface, and therefore it is free from the problem with ordinary multi-layered film-coated antireflection lenses that their performance may change owing to the change in the refractive index of the substrate. As a result, the entire lens that has a refractive index profile realizes good antireflection capability.

What is claimed is:

1. A gradient-index lens comprising a transparent material having a refractive index profile, wherein a light transmission face has a micro prismatic structure, wherein the micro prismatic structure is constituted by a plurality of conical projections, and the conical projections are two-dimensionally disposed on the light transmission face of the lens in any one of hexagonal, tetragonal and orthorhombic arrangements, or a combined arrangement of the hexagonal, tetragonal and orthorhombic arrangements.

2. The gradient-index lens according to claim 1, wherein projections to form the micro prismatic structure have a height of not less than 0.25 $\lambda$ and a distance between neighboring projections is not more than $\lambda$, based on the applied wavelength $\lambda$.

3. The gradient-index lens according to claim 1, wherein the gradient-index lens is cylindrical and has a concentric refractive index profile starting from a center axis of the gradient-index lens in a radial direction thereof.

4. The gradient-index lens according to claim 3, of which the refractive index profile is formed through ion-exchanging.

5. The gradient-index lens according to claim 4, wherein glass is served as a mother material.

6. The gradient-index lens according to claim 1, wherein the gradient-index lens is planar and has a semispherical refractive index profile starting from its surface.

7. The gradient-index lens according to claim 1, which is a spherical or non-spherical lens having a refractive index profile running in the optical axis thereof.

8. The gradient-index lens according to claim 1, wherein the conical projections are so designed that a cross-sectional area thereof gradually decreases from a bottom to a top of each projection, and the conical projections are in any form of cones, polygonal pyramids, frustums of cones and frustums of polygonal pyramids, shapes in which hypotenuses are curved or in stepwise, or shapes having a curved apex.

9. The gradient-index lens according to claim 1 wherein the reflectance at said light transmission face is not more that 1%.

* * * * *